INVENTORS:
PAUL J. PELCZYNSKI,
ROGER C. THIELKING,
BY William S. Wolfe
THEIR ATTORNEY.

COLOR TELEVISION RECEIVER EMPLOYING SINGLE VIDEO AMPLIFIER

Filed March 2, 1966

INVENTORS:
PAUL J. PELCZYNSKI,
ROGER C. THIELKING,
BY William S. Wolfe
THEIR ATTORNEY.

3,422,217
COLOR TELEVISION RECEIVER EMPLOYING SINGLE VIDEO AMPLIFIER

Paul J. Pelczynski, Syracuse, and Roger C. Thielking, North Syracuse, N.Y., assignors to General Electric Company, a corporation of New York Filed Mar. 2, 1966, Ser. No. 531,106
U.S. Cl. 178—5.4 16 Claims
Int. Cl. H04n 5/44

ABSTRACT OF THE DISCLOSURE

A color television receiver with a video detector connected to a single stage video amplifier and a composite signal detector connected to a composite signal amplifier, the amplified composite signal including a video component coupled to a sync separator and an AGC keyer and further including an audio component coupled to an audio detector.

Figure 1:
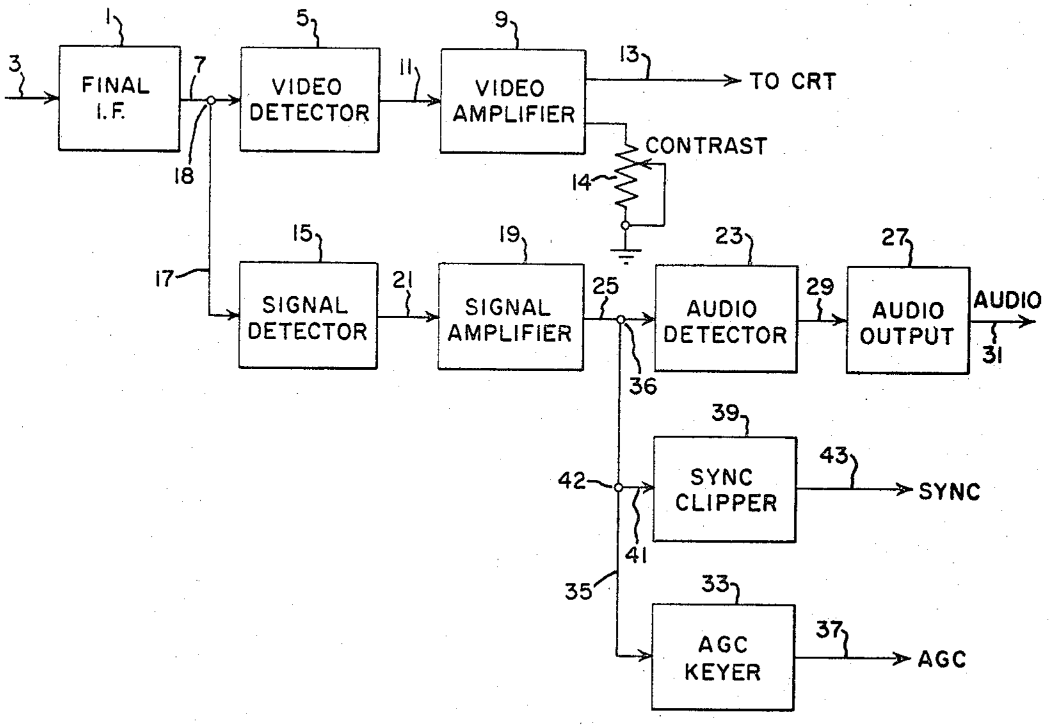

The present invention relates to television receivers and more specifically to a color television receiver employing a single video amplifier.

In the conventional color television receiver a plurality of video amplifier stages are employed. More specifically, it is conventional to amplify the detected video signal through the use of three successive video amplifier stages. In such a circuit a contrast control is generally provided in the cathode circuit of the third video amplifier while a portion of the amplified video output of the first video amplifier is applied to the keyed AGC and sync separator stages.

Due to the unique requirements of color television receivers, it is necessary to place the contrast control in the cathode circuit of the video amplifier rather than in the plate circuit as is conventional with monochrome receivers. More specifically it is virtually impossible to obtain satisfactory contrast control by providing a potentiometer in the plate circuit of the video amplifier. This situation is due in part to the large capacitive load presented by the color cathode ray tube. Further, if a delay line is employed in the plate circuit of the video amplifier in order to delay the luminance information in the necessary fashion, undesired interaction between the delay line and the contrast control would result.

Since, in the conventional color receiver circuit, the input to the keyed AGC stage is derived from a circuit point prior to the third video amplifier, a contrast control potentiometer in the cathode circuit of that amplifier is outside the AGC loop and is thus effective for controlling the peak to peak amplitude of the amplified video signal to thereby provide the desired contrast control.

It is desirable from a standpoint of cost, weight, reliability, etc. to eliminate the necessity for plural video amplifiers so that a single video amplifier can be employed. However, where a single video amplifier is employed, it has heretofore been impossible to provide a contrast control in the cathode circuit of the video amplifier. More specifically, since a portion of the output of the video amplifier must be applied to the AGC stage for gain control purposes, the use of a contrast control in the cathode circuit of the video amplifier would position the contrast control in the AGC loop. Accordingly, any changes in the contrast control potentiometer setting would merely result in compensating changes of the AGC voltage which would tend to maintain the existing contrast condition.

The present invention overcomes the prior art problems by providing an improved color television receiver employing a single video amplifier having a contrast control associated therewith.

Thus an object of the invention is to provide an improved color television receiver.

A further object is to provide an improved color television receiver employing a single video amplifier.

Yet another object is to provide an improved color television receiver employing a single video amplifier having a contrast control provided in the cathode circuit thereof.

These and other objects are achieved in one embodiment of the invention through the use of a composite signal detector and composite signal amplifier to replace the detector and amplifier conventionally utilized to derive only the audio modulated 4.5 mc. intercarrier signal. The output of the last IF stage is applied to both a video detector and the composite signal detector, the output of the video detector being applied to a single video amplifier having a contrast control provided in the cathode circuit thereof. The composite signal detector and the associated composite signal amplifier respectively detect and amplify a signal containing video as well as audio information. The composite output of the signal amplifier is connected to an audio detector, a sync clipper and a keyed AGC stage. In this manner the necessary signal is derived for the AGC keyer at a circuit point prior to the single video amplifier. Thus the contrast control provided in the cathode circuit of the video amplifier is outside the AGC loop and accordingly is effective to provide the desired contrast control.

Figure 3:
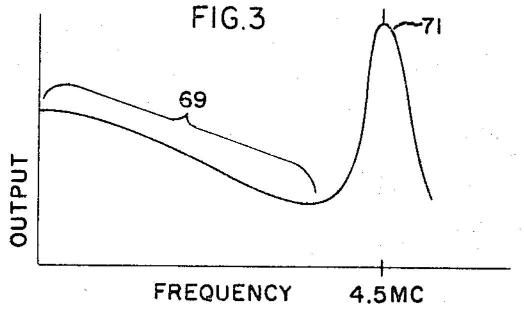
Figure 2:
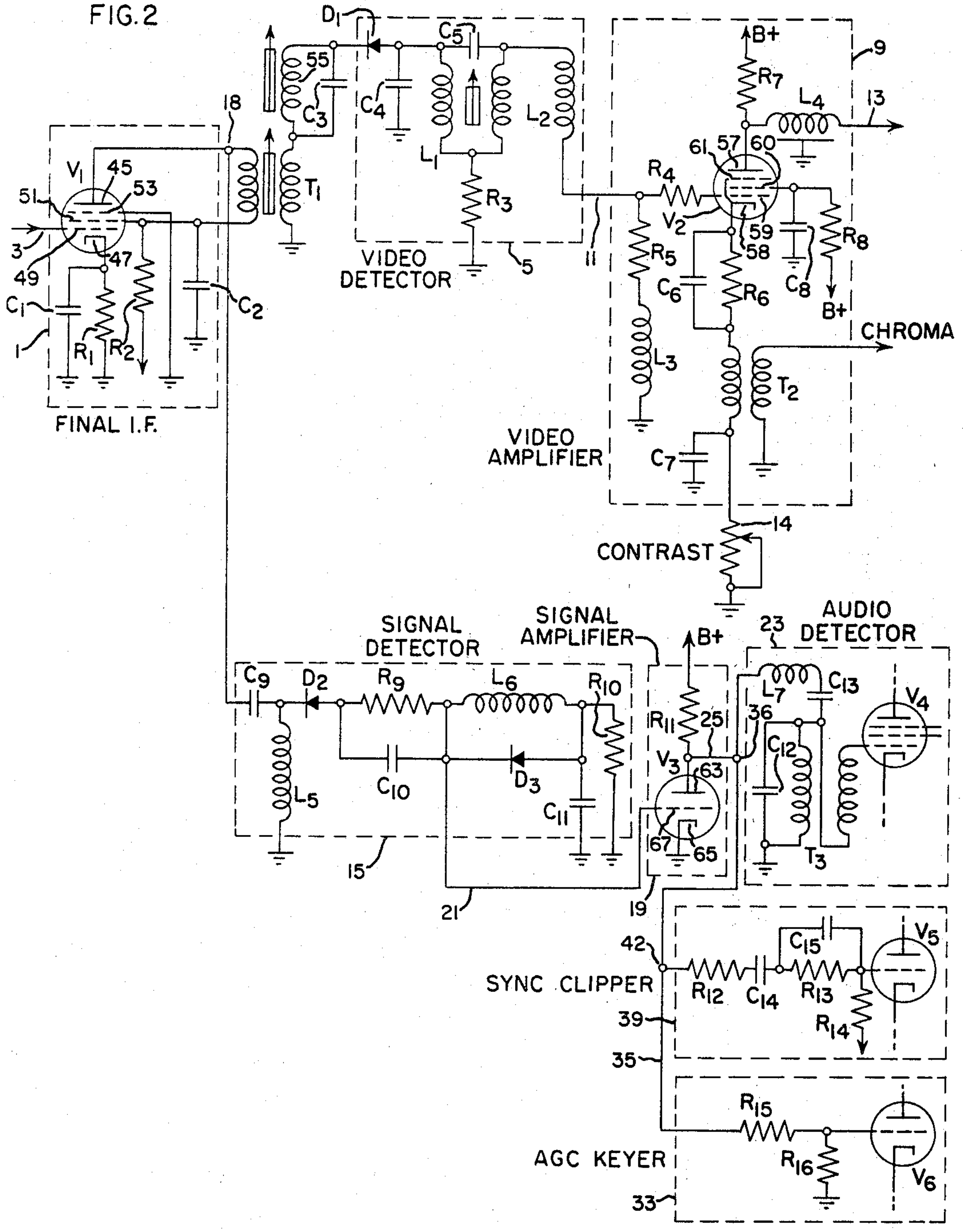

The novel and distinctive features of the invention are set forth in the appended claims. The invention itself together with further objects and advantages thereof, may best be understood by reference to the accompanying drawings in which:

FIGURE 1 is a block diagram of the color television receiver circuitry of the invention, FIGURE 2 is a schematic diagram of the circuitry shown generally in FIGURE 1, and FIGURE 3 is the frequency response characteristic of the composite signal amplifier depicted in FIGURES 1 and 2.

Referring to FIGURE 1 there is shown in block diagram form the color television receiver circuitry of the invention. As depicted, the output of a preceding IF stage (not shown) is applied to a final IF stage 1 via the line 3. The amplified IF signal at the output of IF stage 1 is then applied to a conventional video detector 5 via the line 7, the video detector 5 providing a detected video output which is applied to a single video amplifier 9 via line 11 to develop an amplified video signal on line 13. The video amplifier 9 has a contrast control 14 associated therewith for controlling the peak to peak amplitude of the amplified video signal. The amplified video signal is then applied to a color cathode ray tube (not shown) in conventional fashion.

In accordance with the invention, a composite signal detector 15 is provided. The output of the final IF stage 1 is applied to the detector 15 via the line 17, the line 17 being connected to line 7 at circuit point 18. The output of the signal detector including detected audio, sync and video information is applied to a composite signal amplifier 19 via the line 21.

The output of the signal amplifier 19 is applied to an audio detector 23 via the line 25, the output of the audio detector 23 being in turn applied to the audio output stage 27 via the line 29 to develop an amplified audio signal on the line 31.

The output of the signal amplifier 19 is also applied to a conventional AGC keyer stage 33 via the line 35, the line 35 being connected to the line 25 at circuit point 36. The AGC keyer stage 33 produces an automatic gain control voltage on line 37.

The output of the signal amplifier 19 is further applied to a conventional sync clipper stage 39 via the line 41, the line 41 being connected to the line 35 at circuit point 42. In this manner the sync clipper 39 provides separated sync information on the line 43.

The operation of the circuitry of FIGURE 1 is such that the amplified IF signal is applied to both the video detector 5 and the composite signal detector 15. The video detector 5 serves to provide a detected video signal at the input of the video amplifier 9, the video amplifier 9 providing an amplified positive going video signal on line 13 for application to the three cathodes of the color cathode ray tube in conventional fashion. The signal on line 13 thus comprises the luminance or Y channel portion of the color signal. In accordance with a feature of the invention the single video amplifier 9 is provided with a contrast control 14 which serves to vary the peak to peak amplitude of the signal on line 13 to thereby provide the desired contrast control.

As distinguished from the operation of the video detector 5, the composite signal detector 15 is designed to pass both the 45.75 mc. video carrier and the 41.25 mc. audio carrier, the output of the signal detector 15 being applied to the narrow band composite signal amplifier 19. This amplifier in addition to amplifying the audio and video information serves to degrade the synchronizing pulses so that the pulses are effectively delayed in such a manner that this delay plus the delay achieved in the sync clipper and related circuitry equals the delay of the luminance and chroma information.

The output of the signal amplifier is applied to a conventional audio detector 23, the output of the audio detector being amplified in audio output amplifier 27 and then applied to a reproducer via line 31. Similarly, the output of the signal amplifier is applied to the sync clipper 39 to provide separated sync information on line 43, this sync information being properly delayed relative to the luminance and chroma information due to the action of the signal amplifier 19. Similarly, the output of the signal amplifier 19 is applied to the AGC keyer stage 33. This stage is keyed in conventional fashion so that the AGC voltage is determined by the level of the sync pulses and is not affected by scene brightness.

It will be sene in the circuitry of FIGURE 1 that although a single video amplifier is employed having a contrast control 14 associated therewith, the contrast control is outside of the AGC loop since the signal for the AGC keyer 33 is derived from a circuit point prior to the video amplifier 9 and thus the contrast control is effective for providing the desired control.

Similarly, since the input to the signal detector 15 is derived from a circuit point prior to the contrast control 14, this control has no effect on sync and audio outputs.

Referring to FIGURE 2, there is shown in schematic form a preferred circuit embodiment of the circuitry shown in FIGURE 1, like reference numerals being utilized to identify those stages and circuit points common to FIGURE 1.

The final IF stage 1 comprises a pentode $V_1$ having anode, cathode, control grid, screen grid and suppressor grid electrodes 45, 47, 49, 51 and 53 respectively. The pentode $V_1$ is self-biased by a resistor $R_1$ connected between cathode 47 and ground, the resistor $R_1$ being bypassed by a capacitor $C_1$. The anode 45 is connected to one end of the primary of a slug tuned IF transformer $T_1$, the opposite end of the transformer primary being connected to the screen grid 51. The screen grid 51 and thus the anode 45 are connected to a suitable source of DC potential, such as for example 135 v., by a dropping resitsor $R_2$ while a bypass capacitor $C_2$ is connected between the screen and ground.

The output of the final IF stage 1 is inductively coupled to the video detector 5 by the IF transformer $T_1$, the secondary of the transformer $T_1$ including a portion 55 shunted by a capacitor $C_3$. Portion 55 of the secondary of transformer $T_1$ is tuned to 41.25 mc. by the capacitor $C_3$, these circuit elements serving as a trap for the audio carrier and thus attenuating the audio carrier piror to detection of the video signal.

The video detector 5 comprises a diode $D_1$ poled as shown having a capacitor $C_4$ connected between the anode and ground in conventional fashion. A 4.5 mc. trap comprising the bifilar wound inductor $L_1$, capacitor $C_5$ and resistor $R_3$, is provided to attenuate the 4.5 mc. residual audio intercarrier in the detected video signal, the 4.5 mc. frequency of course being the beat frequency between the audio and picture carriers. The detected video signal from which the audio information has been removed is coupled to the single video amplifier 9 by an inductor $L_2$, the inductor being self resonate at approximately 44 mc. and serving to block the residual IF from the video amplifier.

The single video amplifier 9 comprises a pentode $V_2$ having anode, cathode, control grid, screen grid and suppressor grid electrodes 57, 58, 59, 60 and 61 respectively. The output of the video detector 5 is coupled to the control grid 59 via a diode current limiting resistor $R_4$, the resistor $R_4$ serving to limit current through the diode $D_1$ in the event that contol grid current flows due to malfunction of the video amplifier $V_2$. Serially connected resistor $R_5$ and inductor $L_3$ serve the dual function of providing a ground return path for the control grid of the video amplifier and as a load for the detector diode $D_1$. The pentode $V_2$ is provided with a cathode peaking circuit comprising resistor $R_6$ bypassed by a capacitor $C_6$ in conventional fashion.

The low end of the resistor $R_6$ is connected to ground through the primary of a chroma takeoff transformer $T_2$ and the contrast control potentiometer 14, the potentiometer 14 being bypassed for high frequencies by a capacitor $C_7$. The secondary of the chroma takeoff transformer $T_2$ applies the chroma information to the color processing circuitry (not shown) in conventional fashion. The contrast potentiometer 14 controls the gain of the video amplifier by increasing or decreasing degeneration in accordance with the positioning of the center tap thereof.

The anode 57 of pentode $V_2$ is connected to a suitable source of positive potential, such as for example a B+ supply of 280 v. through a resistor $R_7$. A delay line $L_4$ is also connected to the anode 57, the delay line $L_4$ being utilized to delay the luminance information applied to the cathodes of the cathode ray tube via line 13 in order to compensate for inherent delay of the chroma information in the chroma channel.

The screen grid 60 of pentode $V_2$ is connected to the B+ supply by a resistor $R_8$ having a capacitor $C_8$ connected in shunt therewith in conventional fashion.

The output of the final IF is also applied to the composite signal detector 15, this detector serving to demodulate video sync information for the clipper and AGC keyer stages as well as developing the audia intercarrier as pointed out above.

The signal detector 15 comprises a detector diode $D_2$, the cathode of the diode $D_2$ being connected to circuit point 18 through a coupling capacitor $C_9$. An inductance $L_5$ is connected between the cathode of the diode $D_2$ and ground to provide a DC return for the diode, the inductor $L_5$ further exhibits a high impedance to the IF signal to develop the IF signal thereacrcoss.

The anode of the diode $D_2$ is connected to ground through the serial combination of resistor $R_9$, inductor $L_6$ and resistor $R_{10}$, the resistors $R_9$ and $R_{10}$ serving as the diode load and developing the video signal while the 4.5 mc. audio information is developed across the inductor $L_6$. The output of the signal detector 15 is derived from the junction between the resistor $R_9$ and the inductor $L_6$, this output being applied to the signal amplifier 19 via the line 21.

The signal detector further includes a capacitor $C_{10}$ connected in shunt with the resistor $R_9$, this capacitor being essentially a short circuit to the 4.5 mc. signal and thus in essence applying this signal directly to the inductor $L_6$.

The cold end of the inductor $L_6$ is connected to ground through a capacitor $C_{11}$ to complete the circuit path for the 4.5 mc. signal. The inductor $L_6$ is chosen to resonate at the 4.5 mc. frequency with the input capacity of the signal amplifier 19.

A diode $D_3$ is connected in shunt with the inductor $L_6$, the cathode of the diode being connected to the hot end of the inductor while the anode is connected to the cold end. The diode $D_3$ serves as a damper for the 4.5 mc. signal developed across the resonant circuit defined by the inductor $L_6$ in conjunction with the input capacity of the signal amplifier to prevent this signal from rising to an excessively high level. It will be appreciated that the diode $D_3$ although depicted with a polarity as shown, could also be connected in the opposite polarity and still perform the desired damping function.

The signal amplifier 19 comprises a triode $V_3$ having anode, cathode and control grid electrodes 63, 65 and 67 respectively. Cathode 65 is connected to ground while the anode 63 is connected to the B+ supply through a resistor $R_{11}$. The output of the signal detector 15 is applied to the control grid 67 of the triode $V_3$ via the line 21 while the amplified signal present on anode 63 is applied to circuit point 36 via line 25.

The signal at circuit point 36 is applied to a conventional audio detector 23 comprising a pentode $V_4$ having a bifilar interstage transformer $T_3$ connected to the control grid thereof, the primary $T_3$ being tuned by a capacitor $C_{12}$. Serially connected inductor $L_7$ and capacitor $C_{13}$ are connected between circuit point 36 and the transformer $T_3$ in order to isolate AGC and sync signals from the audio detector. The detected audio information is derived from the pentode $V_4$ in conventional fashion.

The signal at circuit point 36 is also applied to conventional sync clipper 39 comprising a triode $V_5$, the signal at circuit point 36 being applied to the control grid of the triode $V_5$ through an isolation resistor $R_{12}$, coupling capacitor $C_{14}$ and the parallel combination of resistor $R_{13}$ and capacitor $C_{15}$. The grid of the triode $V_5$ is connected to a suitable DC supply, such as for example 135 v., by a resistor $R_{14}$ to establish the desired bias condition of the tube. The separated sync pulses are derived from the output of the sync clipper in conventional fashion.

The signal at circuit point 36 is further applied to a conventional AGC keyer 33 comprising a triode $V_6$, the signal at circuit point 36 being DC coupled to the control grid of AGC keyer $V_6$ by a resistor $R_{15}$. A resistor $R_{16}$ is connected between the control grid and ground in conventional fashion, the resistors $R_{15}$ and $R_{16}$ forming a voltage divider for the signal applied to the control grid of the AGC keyer. The AGC voltage is derived from the output of the keyer tube for application to the appropriate RF and IF stages in conventional fashion.

A general explanation of the operation of the circuit of FIGURE 2 has been given above in connection with the block diagram of FIGURE 1; however, a more detailed explanation of the operation of the circuit of FIGURE 2 follows.

The amplified signal applied to the pentode $V_1$ on the line 3 is again amplified to produce a high level IF signal in the range of 40 to 46 mc. across the primary of the transformer $T_1$. This signal includes the picture carrier at 45.75 mc., the chroma information and the accompanying sound carrier at 41.25 mc. The picture carrier is of course amplitude modulated in accordance with the brightness of the picture being transmitted while the sound carrier is frequency modulated in conventional fashion. Further, the chroma sub-carrier is modulated in quadrature by a pair of color difference signals in well-known fashion to produce a signal which varies in amplitude and phase with saturation and hue variations respectively.

The IF signal across the primary of the transformer $T_1$ is inductively coupled to the secondary of the transformer to thereby apply the IF signal to the video detector 5. Portion 55 of the secondary of the transformer $T_1$ in conjunction with the capacitor $C_3$ serves as a trap for the 41.25 mc. audio carrier to block the audio carrier, such a trap being necessary to prevent undesired interaction between the chroma subcarrier and the audio carrier. The IF signal including the audio carrier in greatly attenuated form is thus applied to the video detector 5.

The video detector 5 operates as a conventional series detector, the diode $D_1$ serving to rectify the IF signal to provide the negative going portion of the IF envelope while the capacitor $C_4$ serves to filter the carrier from the signal so that only the envelope is applied to the video amplifier. The IF signal is rectified and filtered by the action of diode $D_1$ and capacitor $C_4$ respectively and is then coupled to the grid 59 of the video amplifier $V_2$, the inductor $L_1$, capacitor $C_5$ and resistor $R_3$ being employed to trap the 4.5 mc. residual audio information resulting from beating of the audio carrier and the video subcarrier. The output of the video detector 5 is developed across the load comprising resistor $R_5$ and inductor $L_3$, this signal which includes both Y and chroma information being coupled to the control grid 59 of video amplifier $V_2$ by diode current limiting resistor $R_4$.

The operating condition of the video amplifier $V_2$ is established by the bias voltage defined by the DC level of the detected video signal in conjunction with the setting of the contrast potentiometer 14. More specifically, as the movable arm or the contrast potentiometer 14 is moved downward and more resistance is added in the cathode circuit of the video amplifier $V_2$ degeneration is increased and amplification reduced. In this manner the peak to peak amplitude of the signal at the anode 57 of the tube $V_2$ is controlled to provide the desired contrast control. The Y or luminance signal is derived from the anode 57 of the video amplifier $V_2$ and applied to the cathodes of the cathode ray tube or to a suitable matrix through a delay line $L_4$, the delay line delaying the Y signal by an amount such that overall delay of this signal is the same as the inherent delay of the chroma signal. The chroma information is derived from the cathode circuit of the video amplifier $V_2$ by the transformer $T_2$.

The IF signal at circuit point 18 containing the picture carrier, chromanance information and the sound carrier is also applied to the signal detector 15 via the coupling capacitor $C_9$. The signal detector 15 operates as a series detector wherein the diode $D_2$ rectifies the IF envelope, the rectified signal being filtered to develop both the video and audio signals.

As shown, in IF signal is coupled to the cathode of the diode $D_2$, the cathode of the diode being returned to ground through an inductor $L_5$ which presents a high impedance to the IF signal. Thus, a negative going signal is developed at the anode of the diode $D_2$, this signal containing both video and audio intercarrier components. The current path path for the video signal between the anode of the diode and ground is through resistor $R_9$, inductor $L_6$ and resistor $R_{10}$. A negative going video signal is thus developed across the resistors $R_9$ and $R_{10}$, the inductor $L_6$ representing essentially a short circuit to the video signal.

The current path for the audio intercarrier signal between the anode of the diode $D_2$ and ground is through capacitor $C_{10}$, inductor $L_6$ and capacitor $C_{11}$, capacitors $C_{10}$ and $C_{11}$ shunting the audio intercarrier signal around the resistors $R_9$ and $R_{10}$ respectively. Thus a detected negative going audio intercarrier signal is developed across the inductor $L_6$. The diode $D_3$ positioned in shunt with the inductor $L_6$ damps the audio intercarrier signal developed across the inductor $L_6$ to prevent this signal from rising to such a level that the signal amplifier triode $V_3$ draws grid current which would result in undesired modulation of the synchronizing signal by the audio signal.

The detected video and audio intercarrier signals are applied to the control grid 67 of the triode $V_3$. The operation of the triode $V_3$ is essentially that of a reduced bandwidth video amplifier peaked at the 4.5 mc. audio intercarrier frequency. The characteristic of the signal amplifier 19 is shown in FIGURE 3. As depicted in FIGURE 3 the output of the signal amplifier 19 is seen to fall off rapidly in the video portion 69 of the characteristic and to exhibit a peak 71 at the 4.5 mc. audio intercarrier frequency. The decrease of output with frequency in the video portion of the characteristic of FIGURE 3 is realized through the use of a triode tube for the signal amplifier 19 rather than using a pentode for this purpose. Thus, in the triode $V_3$ grid to plate capacity is relatively large so that degeneration increases substantially as frequency increases thereby resulting in the characteristic of FIGURE 3.

The desired peak at 4.5 mc. is achieved through the presence in the plate circuit of the triode $V_3$ of a low impedance resonant circuit comprising the interstage transformer $T_3$ and the capacitor $C_{12}$, these elements resonating at the desired 4.5 mc. frequency. The output at the anode 63 of the tube $V_3$ is applied to the transformer $T_3$ and capacitor $C_{12}$ through the serial connection of $L_7$ and $C_{13}$ which elements represent a short circuit to the 4.5 mc. signal while isolating the AGC and sync signals from the audio detector. In this manner, the desired frequency modulated 4.5 mc. audio signal is applied to the audio detector 23 for detection in conventional fashion.

In accordance with another aspect of the invention, the aforementioned capacitive feedback inherent in the triode $V_3$ over the video range is employed to advantage to effectively delay the sync pulses to compensate for inherent delay in the chroma channel and the delay provided by the delay line $L_4$ in the Y channel. More specifically, it will be appreciated that since the output of the signal amplifier 19 decreases rather substantially with the frequency, the sync pulses will be degraded and thus effectively delayed. For example, it is found in the circuit of FIGURE 2 that where a 0.7 microsecond delay of the sync pulses is required the 3 db bandwidth of portion 69 of the characteristic should be on the order of 750 kilocycles. In this manner, the necessity for delaying the sync pulses through the use of special techniques such as delay lines subsequent to the signal amplifier 19 is eliminated.

The sync pulses properly delayed through the action of the signal amplifier 19 are applied to both the sync clipper 39 and the AGC keyer 33. The delayed sync pulses are AC coupled to the sync clipper 39, this stage serving to clip the sync pulses to separate these pulses from the remainder of the video signal in conventional fashion. Similarly, the delayed sync pulses are DC coupled to the AGC keyer 33, this stage being keyed in conventional fashion to produce an AGC voltage dependent on the amplitude of the sync pulses, but independent of picture content.

It will be appreciated that the 4.5 mc. audio intercarrier at circuit point 36 will not adversely affect the operation of the sync clipper 39 or AGC keyer 33. More specifically, the 4.5 mc. signal is attenuated by resistor $R_{12}$ and the conventional noise rejection circuitry comprising $C_{15}$ and $R_{13}$ in the grid circuit of the sync clipper and is decoupled from the AGC circuitry by action of the relatively large resistor $R_{15}$ and the large input capacity of the triode $V_6$.

In one particularly successful embodiment of the circuit shown in FIGURE 2, the following circuit elements were employed.

Video detector 5:
- $D_1$—1N87A germanium diode
- $C_4$—10 pf.
- $C_5$—100 pf.
- $L_1$—center tapped bifilar inductor, 6.6 $\mu$h.
- $L_2$—choke parallel self-resonant at 44 mc.
- $R_3$—8.2K ohms Video amplifier 9:
- $V_2$—⅓ 11BT11
- $C_6$—.015 $\mu$f.
- $C_7$—1500 pf.
- $C_8$—4 $\mu$f. electrolytic
- $L_3$—180 $\mu$h.
- $L_4$—0.7 $\mu$sec. delay line, 3.6K ohm characteristic impedance
- $T_2$—RF transformer, turns ratio 13:85, secondary tuned to 4.2 mc.
- $R_4$—470 ohm
- $R_5$—6.8K ohm
- $R_6$—22 ohms
- $R_7$—10K ohms
- Potentiometer 14–250 ohms Signal detector 15:
- $D_2$—1N87A germanium diode
- $D_3$—silicon diode, similar to type 1N914
- $C_9$—3 pf.
- $C_{10}$—100 pf.
- $C_{11}$—33 pf.
- $L_5$—27 $\mu$h.
- $L_6$—120 $\mu$h.
- $R_9$—4.3K ohms
- $R_{10}$—5.1K ohms Signal amplifier 19:
- $V_3$—⅓ 11BT11
- $R_{11}$—22K ohm Audio detector 23:
- $V_4$—½ 12BF11
- $C_{12}$—150 pf.
- $C_{13}$—22 pf.
- $L_7$—56 $\mu$h.
- $T_3$—autotransformer, 119 turns, tapped at 19 turns, secondary tuned to 4.5 mc.

Sync clipper 39:
- $V_5$—⅓ 8BU11
- $C_{14}$—5000 pf.
- $C_{15}$—470 pf.
- $R_{12}$—15K ohms
- $R_{13}$—470K ohms
- $R_{14}$—10M ohms AGC keyer 33:
- $V_6$—⅓ 11BT11
- $R_{15}$—220K ohms
- $R_{16}$—100K ohms Although the invention has been described with respect to certain specific embodiments, it will be appreciated that modifications and changes can be made by those skilled in the art without departing from the true spirit and scope of the invention. Therefore, it is intended by the appended claims to cover all such modifications and changes that fall within the true spirit and scope of the invention.

What we claim and desire to secure by Letters Patent of the United States is:

1. In a color television receiver including a source of IF signal, circuitry comprising;
- (a) video detecting means connected to the output of the source of IF signal and providing a detected video signal including luminance and chroma components,
- (b) composite signal detecting means connected to the output of the source of IF signal and including first means responsive to a video component and second means selectively responsive to an audio component,
- (c) audio detecting means connected to the output of said signal detecting means to detect said audio component, and
- (d) sync separating means connected to the output of said signal detecting means to derive sync information from the video component.

2. The color television receiver defined in claim 1 further including AGC means connected to the output of said signal detecting means to develop an AGC voltage therefrom.

3. In a color television receiver including a final IF stage, circuitry comprising;

(a) video detector means connected to the output of the IF stage and providing a detected video signal including luminance and chroma components, (b) video amplifier means connected to the output of said video detector means and providing an amplified video signal, (c) composite signal detector means connected to the output of the IF stage and including first means responsive to a video component and second means selectively responsive to an audio component, (d) composite signal amplifier means connected to the output of said composite signal detector means to amplify said composite signal, (e) audio detector means connected directly to the output of said composite signal amplifier means to detect said audio component, (f) audio amplifier means connected to the output of said audio detector means to amplify the detected audio component, (g) sync separator means connected to the output of said composite signal amplifier means to derive the sync information therefrom, and (h) keyed AGC means connected to the output of said composite signal amplifier means to develop an AGC voltage therefrom.

4. The color television receiver defined in claim 3 wherein said composite signal detector means includes;

(a) a rectifying element, (b) said first means being selectively responsive to the video component including a first resistive element connected to said rectifying element, and (c) said second means including an inductor tuned to the audio component and connected to said rectifying element.

5. The color television receiver defined in claim 4 wherein;

(a) said first means includes a second resistive element, said first resistive element and said second resistive element shunted by first and second capacitive elements respectively, and (b) said rectifying element, said first resistive element, said inductive element and said second resistive element being serially connected in the order named and an output being derived at the junction between said first resistive element and said inductive element.

6. The color television receiver defined in claim 5 wherein said composite signal detector means further includes a damping diode connected in shunt with said inductive element.

7. The color television receiver defined in claim 5 wherein said composite signal detector means further includes a second inductive element connected in parallel with said serially connected elements to develop the signal from said IF stage thereacross.

8. The color television receiver defined in claim 3 wherein said composite signal amplifier means comprises a narrow bandwidth video amplifier peaked at the frequency of the audio component.

9. The color television receiver defined in claim 8 wherein said narrow bandwidth video amplifier comprises a triode amplifier having tuned circuit means resonant at the frequency of said audio component connected in the anode circuit thereof.

10. The color television receiver defined in claim 9 wherein;

(a) said tuned circuit means includes a tapped, bifilar interstage transformer, the secondary of said transformer being connected to the input of said audio detector means and the tap of said transformer being connected to the anode of said triode amplifier, and (b) said sync separator means and said keyed AGC means being connected directly to the anode of said triode amplifier.

11. The color television receiver as defined in claim 10 including an inductive and a capacitive element, said inductive and capacitive elements being serially connected between said tap and the anode of said triode amplifier and being series resonant at the frequency of the audio component.

12. The color television receiver defined in claim 3 wherein said video amplifier means comprises a single video amplifier stage having a contrast control associated therewith.

13. The color television receiver as defined in claim 12 wherein said single video amplifier includes an electron discharge device having anode, cathode and control grid electrodes;

(a) the output of said video detector means being connected to said control grid electrode, (b) a delay line being connected to said anode electrode to provide a delayed video output signal, and (c) a contrast control potentiometer being connected to said cathode electrode to control the peak to peak amplitude of the video signal at said anode electrode.

14. The color television receiver defined in claim 13 wherein said single video amplifier further includes a chroma takeoff transformer, the primary of said chroma takeoff transformer being connected to said cathode to develop the chroma signal across the secondary thereof.

15. In a color television receiver including a video amplifier stage, audio detector stage and sync separator stage and being provided with an IF signal including a picture carrier modulated by luminance, chroma, and sync information and an audio carrier modulated by audio information, a system comprising;

(a) first means responsive to the luminance and chroma information for selectively applying the luminance and chroma information to the video amplifier, (b) second means selectively responsive to the audio information for applying the audio information to the audio detector, and (c) means including said last mentioned means responsive to the sync information for applying the sync information to the sync separator stage.

16. The color television receiver defined in claim 15 further including a keyed AGC stage, said means responsive to the sync information also applying the sync information to the keyed AGC stage.

References Cited

UNITED STATES PATENTS

| | | | |
|---|---|---|---|
| 2,832,824 | 4/1958 | Oakley | 178—5.4 XR |
| 2,910,529 | 10/1959 | Splitt | 178—5.4 |
| 3,128,334 | 4/1964 | Heuer | 178—5.4 |
| 3,336,438 | 8/1967 | Marks | 178—5.4 |

ROBERT L. GRIFFIN, *Primary Examiner.*

RICHARD MURRAY, *Assistant Examiner.*

U.S. Cl. X.R.

178—6.7, 6.8